United States Patent [19]

Loigerot

[11] 4,081,007
[45] Mar. 28, 1978

[54] MACHINE FOR CUTTING DOWN AND SHAPING TREES

[75] Inventor: Jean Loigerot, Paris, France

[73] Assignee: Association pour la Rationalisation et la Mecanisation de l'Exploitation Forestiere (A.R.ME.F.), Paris, France

[21] Appl. No.: 680,768

[22] Filed: Apr. 27, 1976

[30] Foreign Application Priority Data

Apr. 29, 1975 France .................. 75 13328
Aug. 13, 1975 France .................. 75 25242
Feb. 20, 1976 France .................. 76 04838

[51] Int. Cl.² .................................... A01G 23/08
[52] U.S. Cl. ........................... 144/3 D; 83/600; 83/601; 144/2 Z; 144/34 E; 144/246 C
[58] Field of Search .............. 144/2 Z, 3 D, 34 R, 144/34 E, 309 AC, 246 R, 246 C, 246 F; 83/600, 601

[56] References Cited

U.S. PATENT DOCUMENTS

| 475,628 | 5/1892 | Stombs | 144/246 C |
|---|---|---|---|
| 2,785,715 | 3/1957 | Brundell et al. | 144/246 F |
| 3,612,117 | 10/1971 | Kjell | 144/2 Z |
| 3,643,712 | 2/1972 | Doel et al. | 144/34 E |
| 3,763,904 | 10/1973 | Eynon | 144/2 Z |
| 3,797,539 | 3/1974 | Moser et al. | 144/2 Z X |
| 3,797,540 | 3/1974 | Propst | 144/2 Z |
| 3,840,058 | 10/1974 | Menzel et al. | 144/2 Z X |
| 3,868,982 | 3/1975 | Kurelek et al. | 144/309 AC |
| 3,989,074 | 11/1976 | Larson | 144/3 D |
| 3,999,582 | 12/1976 | Allen et al. | 144/34 E |

*Primary Examiner*—Othell M. Simpson
*Assistant Examiner*—W. D. Bray
*Attorney, Agent, or Firm*—Kinzer, Plyer, Dorn & McEachran

[57] ABSTRACT

The invention relates to a machine for cutting down and shaping trees, designed to cut down, strip and truncate trees, consisting of a support and cutting down-stripping-truncating equipment likely to be adapted to a self-propelling device, said equipment carrying a movable framework on which the cutting-truncating and stripping elements are positioned, a machine wherein the components thereof are substantially secured along a one and same axis, the stripping element carrying at least two blades surrounding the tree and at least two rollers with barbs the positioning of which can be adjusted by means of jacks, the axis along which the trunk is pulled between the rollers coinciding with the axis of the trunk between the blades.

3 Claims, 12 Drawing Figures

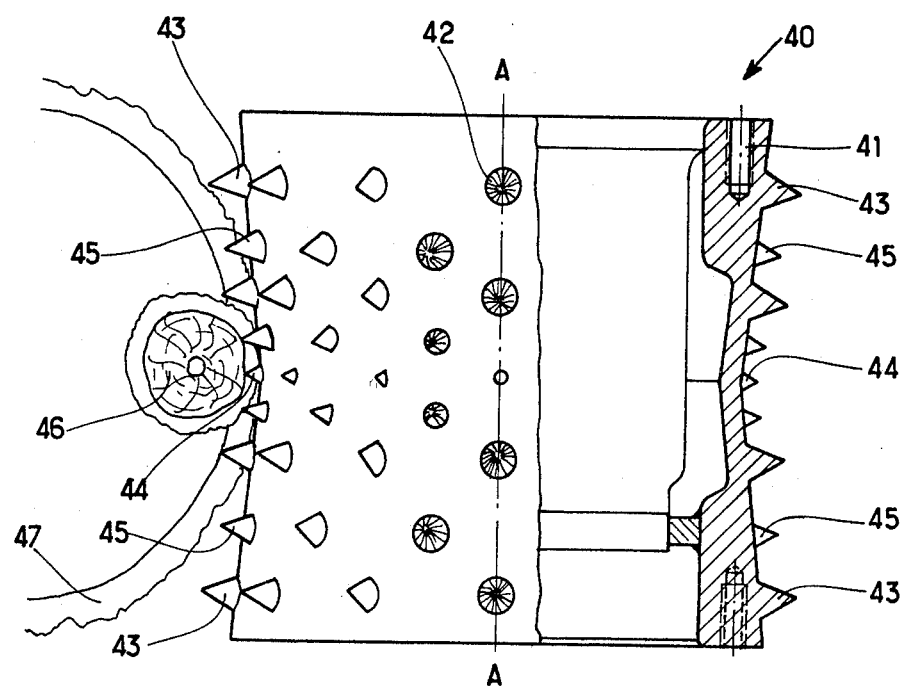
Fig_10

MACHINE FOR CUTTING DOWN AND SHAPING TREES

The present invention relates to a machine for cutting down and shaping trees.

More particularly, said machine is fitted onto a self-propelling device, such as a tractor, and makes it possible to perform in continuous sequence and without any stoppage, cutting down, stripping and truncating of a tree.

The equipments already known do not perform these various operations; however, it is already known to provide stripping equipment consisting of a framework on which driving rollers with straight or helicoidal generatrices and fixed and movable blades are fitted. The movable blades acting at one and the same side so as to enclose the tree between the framework and the fixed blades.

Also, pruning-scissors are known which make it possible to cut stems and trunks: however, most of the existing pruning-scissors carry a framework on which cutting blades are hinged. The latter are operated by jacks secured on the framework.

In view of the great efforts thus transmitted to the blades, the jacks must develop great force and the framework must be very large in size and sturdy.

The purpose of the present invention is, on the one hand, to remedy the drawbacks shown by the equipments already known and, on the other, to provide a machine likely to achieve the whole of the operations without necessitating to reworking the trunks, thereby to save a substantial work efforts.

To this end, the invention relates to a machine for cutting down and shaping trees, designed to cut down, strip and truncate trees, consisting of a supporting assembly and a cutting down-stripping-truncating equipment likely to be adapted to a self-propelling device, said equipment consisting of a movable framework supporting the cutting down-stripping-truncating elements, a machine wherein the elements are substantially secured along one and the same axis, the stripping element carrying at least two blades enclosing the tree and at least two rollers with barbs the positioning of which can be adjusted by means of jacks, the axis along which the trunk is pulled between the rollers coinciding with the axis of the trunk between the blades.

The supporting assembly consists of a framework hinged with the self-propeller device and can be inclined forwards and rearwards, of a reciprocating device, of a lateral slide, and of arms for lifting and rocking the tree on which the cutting down-stripping-truncating equipment is mounted.

Thus, the various components are put together on one and the same machine and make it possible, after the trunk is firstly captured when it is to be cut, to achieve stripping and truncating in succession. Furthermore, the construction of the supporting assembly makes it possible to easily adapt the equipment to the tree after the tractor is previously positioned thanks, in particular, to the hinged framework, the hinged device and the lateral slide.

The machine can be mounted on a support adaptable to a self-propelling device, or carried in various ways on a vehicle, or suspended at the end of a mast.

According to another characteristic of the invention, the cutting tool is a pruning-scissor consisting of two cutting blades hinged around a mutual axis, of two jacks whose bodies are hinged on the blades, the rods of each jack actuating tie-rods also hinged on the blades and integral with rollers forming winding drums, of at least one chain the ends of which are fitted to each roller of each blade, rotation of the tie-rods under action of the jacks causing winding of the chain around the rollers and, afterwards, closing of the pruning-scissor and of a jack whose body is fitted to one of the blades, the rod being fitted to the other, said jack ensuring opening of the pruning-scissor.

Thus, the efforts required to close the pruning-scissor are developed by each jack and the reaction thereof is not transmitted in that case to a framework, but inside each blade: this results in a lightening of the framework and the possibility to develop greater cutting forces thanks to, in particular, the tie-rods and rollers.

According to another characteristic of the invention, the stripping element carries four blades actuated by jacks and hinged on the framework, said blades distributed symmetrically by pair, and two hinged arms carrying barbed rollers the positioning of which is adjusted by jacks arranged between the arms and the framework, said rollers being rotating. The blades are arranged in pairs, a jack, non-connected with the framework, carrying said blades is located between the blades of one and the same pair and ensures rotation thereof. The blades have two cutting edges and carry a cutting section with several arcs of circle each having a different radius.

Thus, whatever their diameters, trees are stripped all along their length, the blades adapting to the shape thereof: moreover, trees are driven by means of the rollers, substantially along their axes, thanks to the diabolo shape of the latter, which has the advantage of bringing the sections of the trunks in front of the various elements, always in the same position.

According to another characteristic of the invention, the machine for cutting down and shaping trees is characterized in that the diabolo-shaped rollers carry, all along their external surface, barbs of different size.

According to another characteristic of the invention, the barbs of the two rollers positioned opposite each other have a complementary distribution, so that they may possibly engage each other.

The present invention will be better understood by means of the drawings attached thereto, wherein:

FIG. 10 is a part cross-section view of a side of a roller with barbs.

FIGS. 1, 2 and 3 show the machine for cutting down and shaping trees mounted onto a tractor.

As shown in said Figures, the machine consists of a supporting assembly B on which is fitted an equipment for cutting down, stripping and truncating a tree A.

The operations for preparing woods are performed by the machine according to the order cited; cutting down and truncating are performed by the same cutting tool likely to be either a pruning-scissor or a saw.

The assembly support-equipment is mounted onto a tractor, but can also be mounted onto any other type of vehicle.

Figure 1:
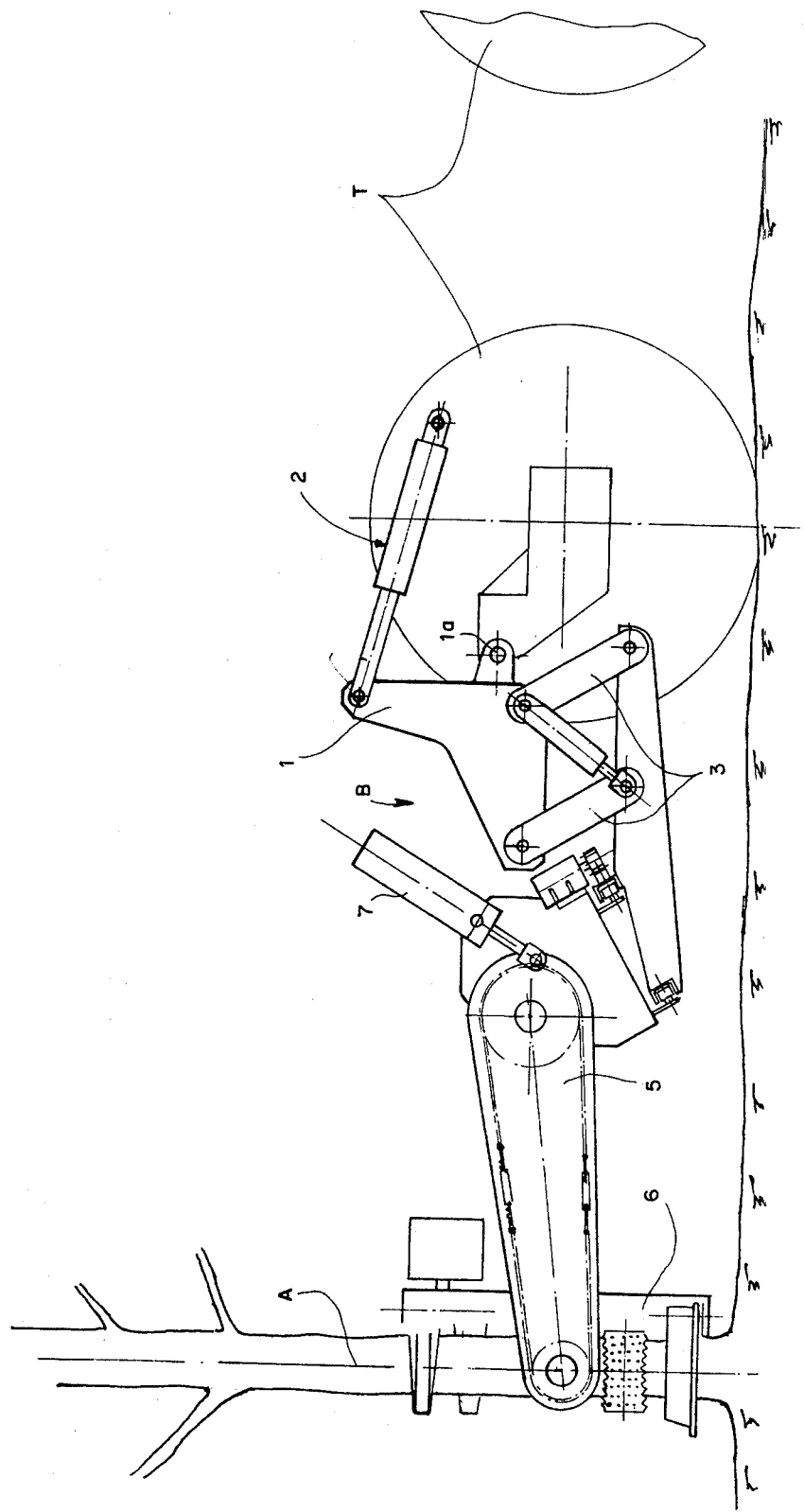
FIG. 1 is a side elevation of the machine.
Figure 2:
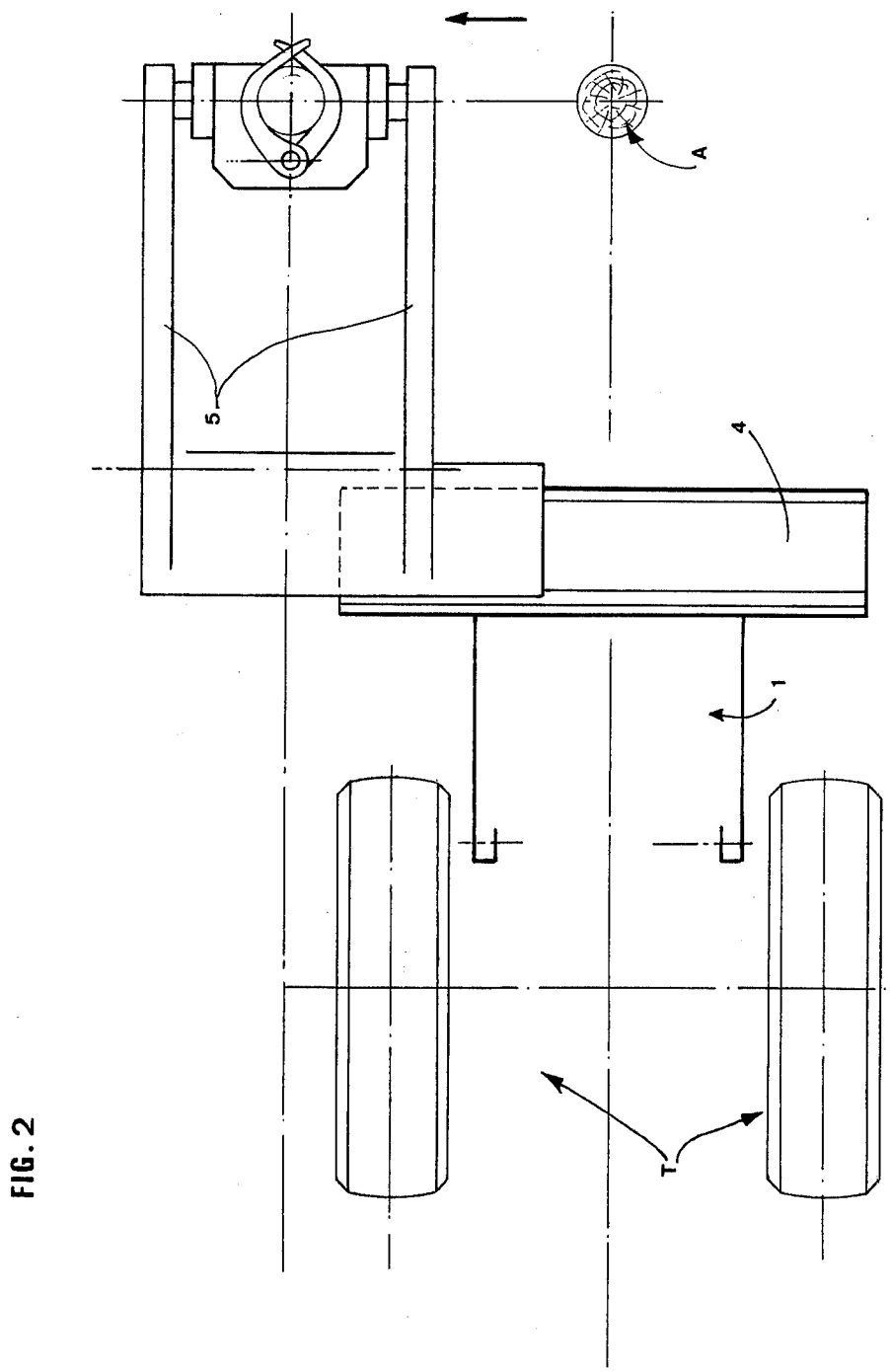
FIG. 2 is a plan view of certain parts of the machine.
Figure 3:
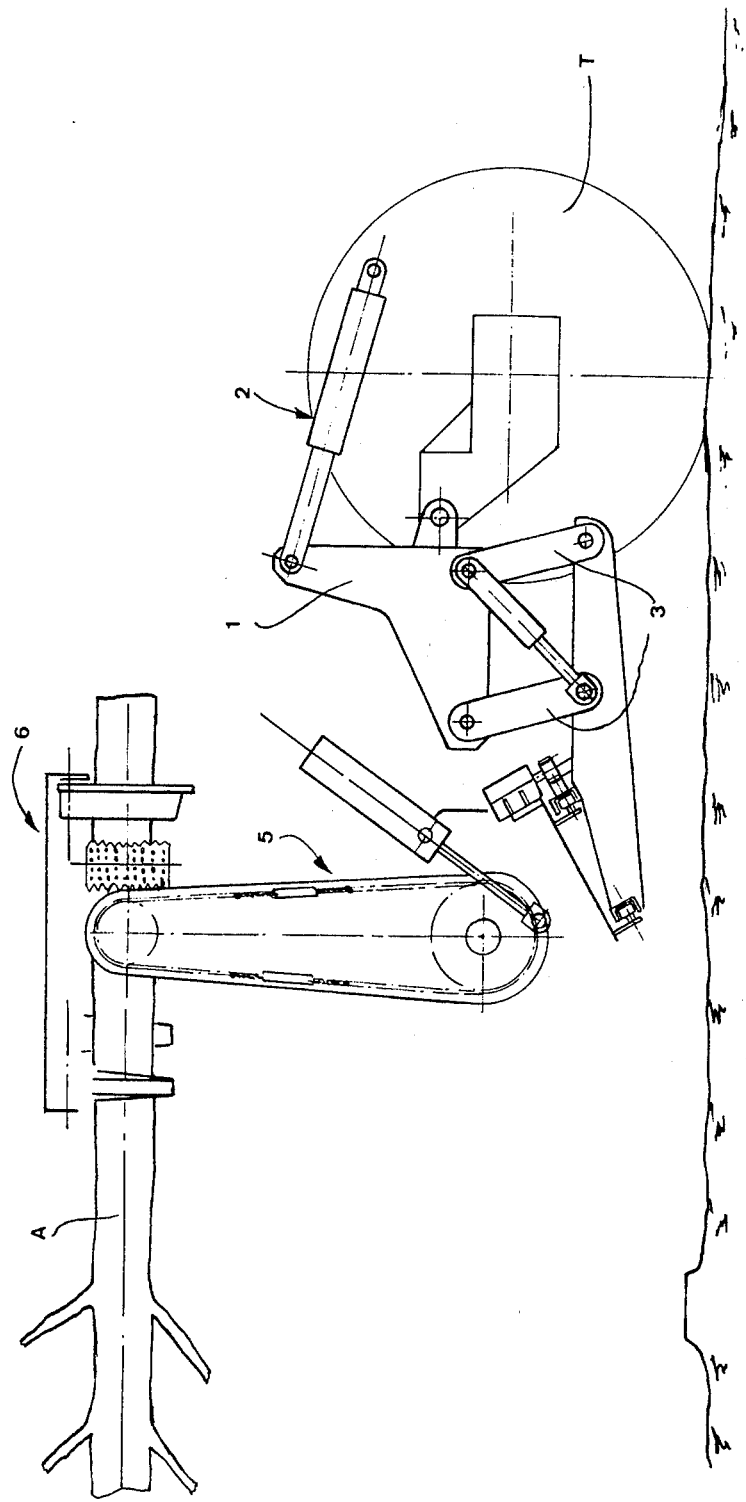
FIG. 3 is a side elevation of said machine with certain parts positioned for performing stripping and truncating of trees.

The supporting assembly essentially consists of: a framework 1 hinged at 1a on the tractor T, FIGS. 1 and 2, and likely to be inclined forward or rearward under the action of two jacks 2, an hinged reciprocating device 3, a lateral slide 4, and two arms 5 for lifting and rocking the tree A between which the cutting down-stripping-truncating equipment 6 is fitted as shown in FIGS. 2 and 3.

The support ensures the various motions described hereafter: the framework 1 and the arms 5 position the cutting down-stripping-truncating equipment. The hinged device 3 makes it possible through a reciprocating motion to introduce the tree to be cut down within the cutting down-stripping-truncating equipment when the tractor T is stopped. The lateral slide 4 ensures translation of both arms 5 and of the cutting down-stripping-truncating equipment 6 towards either side of the tractor. The two lifting arms 5 simultaneously permit lifting and rocking of the tree forward. This performance is more clearly shown in FIG. 3.

The cutting down elements can be different tools such as, for example, chain-saw, circular saw: in the following description these elements are pruning-scissors the specific mode of embodiment of which allows to more easily solve cutting problems.

Figure 5:
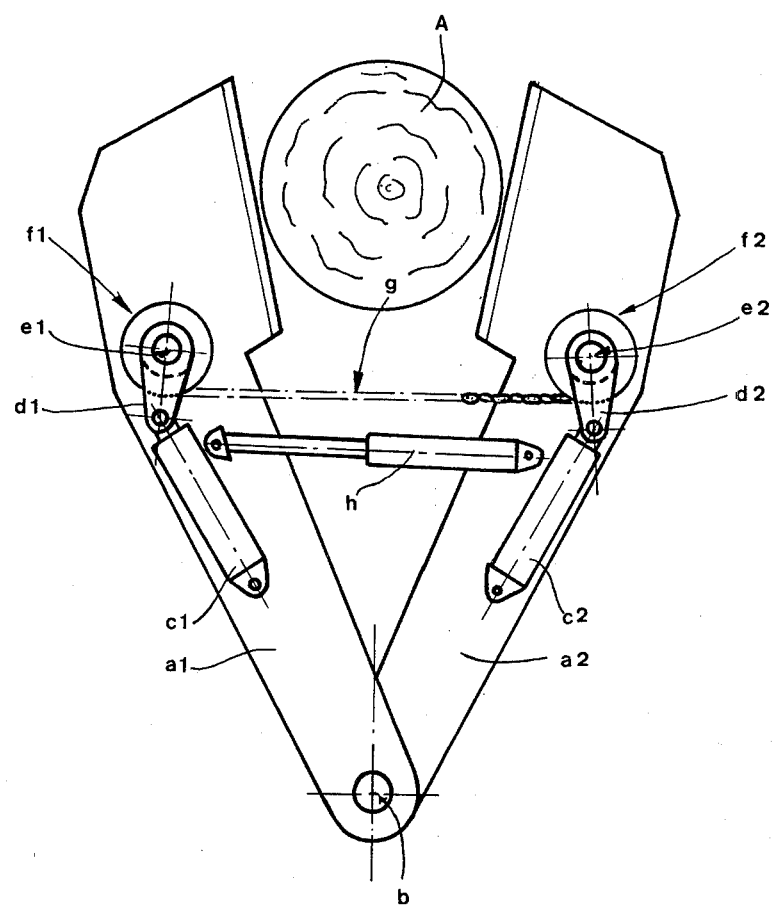
FIG. 5 is a plan view of the pruning-scissor when open.
Figure 6:
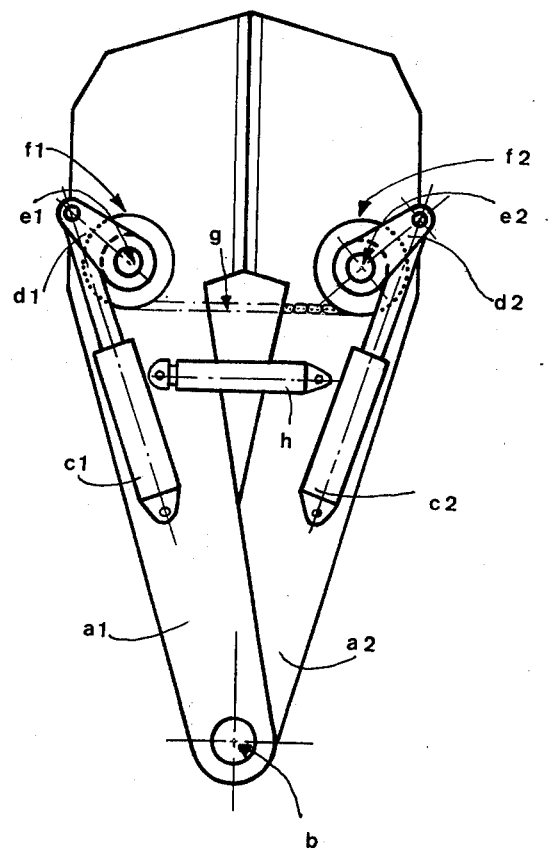
FIG. 6 is a plan view of the pruning-scissor when shut.
Figure 7:
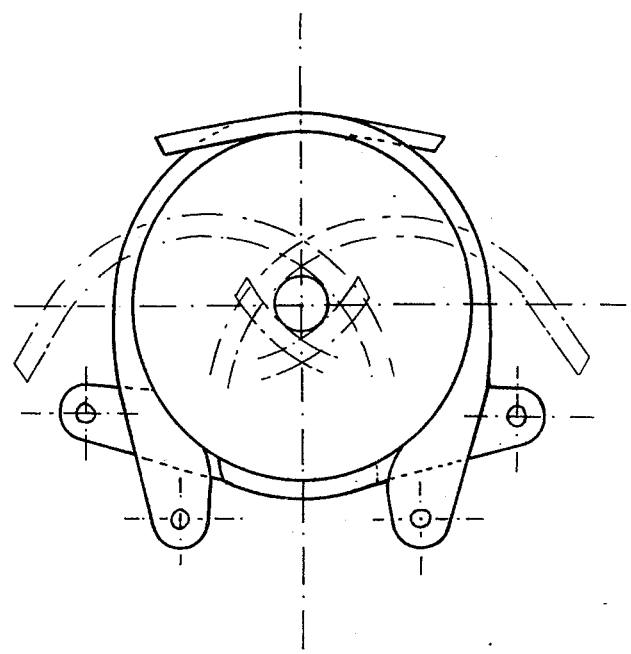
FIG. 7 is a plan view of the stripping blades.
Figure 9:
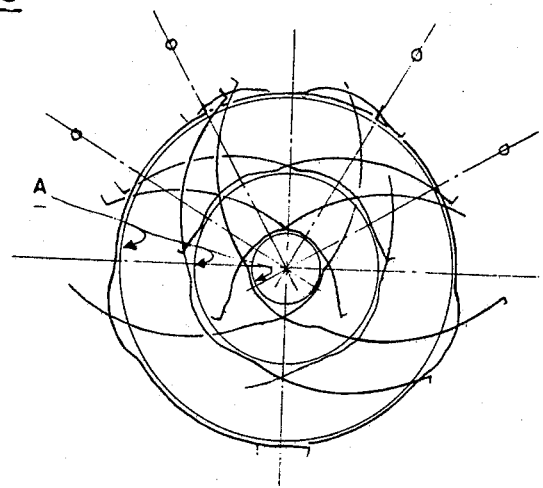
FIG. 9 is a plan view of various positions of the stripping blades (when the diameters of the trunks of the trees are different from each other).

The pruning-scissor arranged at one of the ends of the framework of the cutting down-stripping-truncating equipment consists of the following components shown in FIG. 5: two cutting blades a1 and a2 hinged at b, two jacks c1 and c2 the bodies of which are hinged on the blades a1 and a2. The rods of the jacks actuate two cranks or tie-rods d1 and d2 hinged on the blades at e1 and e2, and two rollers f1 and f2 integral with the tie-rods d1 and d2, wind up the chain g when the rods of the jacks make the tie-rods d1 and d2 rotate.

When the rods of the jacks are all out, the rollers f1 and f2 rotate thus winding up the chain so as to close the cutting blades.

The rollers f1 and f2 can be circular or camshaped so as to obtain the cutting forces sought when a cycle of work is performed.

A jack h or any other type of mechanism ensures opening of the blades after cutting is performed.

The stripping element is arranged along the same axis as that of the cutting down-truncating pruning-scissor. It is provided for, on the one hand, ensuring stripping and, on the other, for moving the tree forward within the equipment so as to have it truncated.

Figure 4:
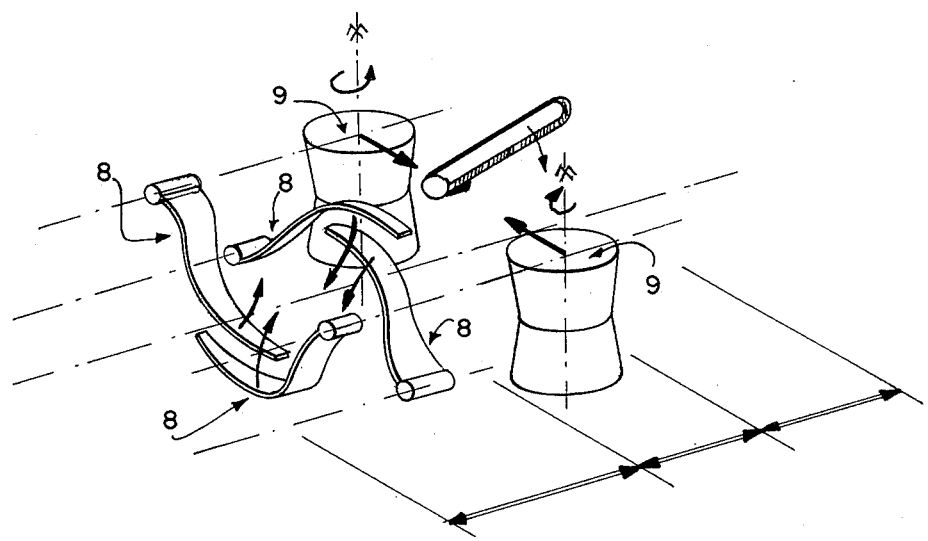
FIG. 4 is a perspective view in principle of the stripping and truncating elements of the cutting down-stripping-truncating equipment.

The stripping element shown in FIG. 4 consists of: a framework, made from welded iron, not shown, on which blades 8 are fitted, on the one hand, and hinged arms (not shown) supporting rollers, on the other. The four blades 8 are actuated by jacks and surround four sides of the tree opposite diametrically by pair, without applying it on the framework.

Figure 8A:
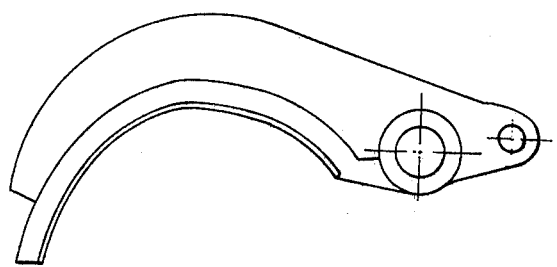
FIGS. 8A and 8B are plan views of different stripping blades.
Figure 8B:
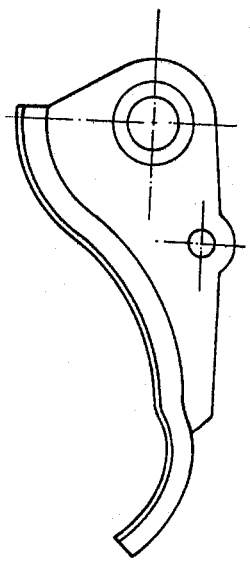

The blades 8 carry two cutting edges. Their shape (see FIGS. 8A and 8B) is originated by the curve tangential to several arcs of circle having different radii making it possible to cover the circumferences of the tree with a minimum of free spaces. Thus, a better shaving of the trunks is obtained.

The support carries rollers 9 with barbs which are diabolo-shaped, the clearance and bringing together of which are operated by a hydraulic jack. The rollers 9, set into rotation in each way, drive the tree through the blades 8 of the stripping element.

The tree A is always centred within the rollers 9 thanks to their diabolo shape.

Thanks to these arrangements, the tree does not apply onto the framework so as to limit the resistant efforts, but runs through the stripping element along the axis of the trunk.

As shown in FIG. 10, the roller with barbs 40 is bi-cone-shaped. Also, it is possible to provide further shapes for the rollers, in particular cylindrical, oblique cones or diabolo shapes. Said rollers carry a bore 41 making it possible to mount the rollers onto a machine for cutting down and shaping trees.

Also, it is to be noted that the barbs 43, 44, 45 are distributed on the roller 40 in such a way that when two rollers 40 are opposite to each other, said barbs are likely to engage each other. Such distribution of the barbs on the rollers ensures a very efficient driving and loading of the trees or trunks to be processed.

The barbs 43, 44, 45 can be achieved from molding, for example, at the same time the rollers 40 are cast. Also, it is quite possible to make out the barbs separately and to afterwards weld them onto the roller 40.

Barbs are distributed all along the external surface of the roller. Said barbs 42 are of different size. The barbs 42, arranged along the circumference of and in the vicinity of the ends of the roller 40, are rather great thus allowing to load and drive trees having a large diameter, then having a relatively thick barke, in view that the thickness of the barke depends on the diameter of the tree. The barbs 44, distributed at the medium portion of the roller, are much more little in size, as they are used for driving trees having a smaller diameter, the barke of which is, consequently, much more thinner.

The in-between barbs 45 have a medium size making it possible to drive trees with a medium diameter. It can be seen in this Figure that the size of the barbs 43, 44, 45 is decreasing progressively when they are being reaching the center of the roller 40.

Of course, the invention is not limited to the mode of embodiment described and represented hereabove, from which other modes and methods of embodiment can be provided without thereby departing from the scope of the invention.

I claim:

1. In a tree-felling and shaping machine consisting of a support unit and a working unit adapted to be fitted to a self-propelling vehicle, said working unit comprising a movable frame supporting members for working on the tree, in which the working members comprise at least two bi-conical rollers mounted on the frame for moving the tree through stripping blades together with at least four pivoting stripping blades mounted on the frame for surrounding the tree trunk, and wherein said rollers and blades are so arranged that the axis along which the tree trunk is moved between the rollers coincides with the axis of the tree trunk between the blades, the improvement comprising:

a cutting tool mounted on the frame and disposed below said rollers and said stripping blades, said cutting tool consisting of two cutting blades articulated about a common axis; two hydraulic jacks and tie rods respectively articulated on the cutting blades, the rods of each of said jacks actuating a corresponding tie rod; and winding rollers, one on each blade; a chain having opposed ends fixed to each of said rollers, whereby actuation of the connecting rods by means of said jacks causes the chain to wind on the rollers thereby closing the cutting blades, and another hydraulic jack, the body of which is fixed to one of the cutting blades with its rod being fixed to the other cutting blade, said other jack opening the cutting blades.

2. A machine according to claim 1, characterized in that the working unit is mounted on a lateral slide so that it can be displaced in a translatory movement towards one or other side of the vehicle.

3. A machine according to claim 2, characterized in that the rollers are provided over the whole extent of their exterior faces with variable height barbs.

* * * * *